United States Patent
Uemura

(10) Patent No.: US 6,781,263 B2
(45) Date of Patent: Aug. 24, 2004

(54) MAGNETO-GENERATOR

(75) Inventor: Fumito Uemura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/287,604

(22) Filed: Nov. 5, 2002

(65) Prior Publication Data

US 2003/0209949 A1 Nov. 13, 2003

(30) Foreign Application Priority Data

May 9, 2002 (JP) ........................................ 2002-134237

(51) Int. Cl.[7] .............................. H02K 1/27; H02K 9/04
(52) U.S. Cl. .......................... 310/74; 310/43; 310/60 R; 310/156.26
(58) Field of Search ............................... 310/74, 156.12, 310/156.23, 156.26, 60 R, 62, 63, 43; 74/572

(56) References Cited

U.S. PATENT DOCUMENTS

| 4,241,620 A | * | 12/1980 | Pichl et al. ............... 74/573 R |
|---|---|---|---|
| 4,710,659 A | * | 12/1987 | Takano et al. .............. 310/153 |
| 5,329,199 A | * | 7/1994 | Yockey et al. .............. 310/263 |
| 6,023,113 A | * | 2/2000 | Otsuka ...................... 310/67 R |
| 6,065,936 A | * | 5/2000 | Shingai et al. .............. 416/175 |
| 6,161,450 A | * | 12/2000 | Sandig ......................... 74/574 |
| 6,339,271 B1 | * | 1/2002 | Noble et al. .................. 310/74 |

FOREIGN PATENT DOCUMENTS

JP          2001-158397 A      6/2001

* cited by examiner

*Primary Examiner*—Burton Mullins
(74) *Attorney, Agent, or Firm*—Sughrue Mion, PLLC

(57) ABSTRACT

A magneto-generator exhibiting high electricity generation efficiency under the forced cooling effect includes a flywheel implemented substantially in a bowl-like shape, a plurality of magnets disposed on and along an inner peripheral surface of the flywheel, a generator coil disposed internally of the flywheel in opposition to the magnets (12) for generating electricity under the action of electromagnetic induction between the magnets and the generator coil, and a plurality of resin fins provided along a peripheral edge of the flywheel at an open end thereof for generating forced gas flows in a peripheral region of the flywheel upon rotation of the flywheel for cooling the generator coil.

4 Claims, 4 Drawing Sheets

MAGNETO-GENERATOR

This application is based on Application No. 2002-134237, filed in Japan on May 9, 2002, the contents of which are hereby incorporated by reference.

BACKGROUND OF THE INVENTION

1. Field of the Invention

The present invention generally relates to a magneto-generator for generating electric energy under the action of electromagnetic induction taking place between magnets mounted on a flywheel and an armature winding during rotation of the flywheel.

2. Description of Related Art

For having better understanding of the concept underlying the present invention, description will first be made of a conventional flywheel type magneto-generator by reference to FIGS. 5 and 6 of the accompanying drawings, in which FIG. 5 is a top plan view showing partially in section a rotor of a conventional flywheel type magneto-generator which is disclosed, for example, in Japanese Utility Model Laid-Open Publication No. 121380/1992, and FIG. 6 is a vertical sectional view of the same taken along a line VI—VI shown in FIG. 5 as viewed in the direction indicated by arrows.

Referring to the figures, a rotor of the magneto-generator includes a flywheel 1 implemented in a substantially bowl-like shape (hereinafter also referred to as the bowl-shaped flywheel only for the convenience of description), four magnets 2 mounted on the inner peripheral surface of the flywheel 1 with equidistance therebetween in the circumferential direction, a guard ring 3 of a substantially cylindrical shape which is formed by drawing a sheet metal and closely or tightly fit onto the inner surfaces of the magnets 2 which are disposed substantially in an annular array, a magnet securing resin 4 filled in the space defined between the flywheel 1 and the guard ring 3 at both sides and between the adjacent end portions of the individual magnets 2 for fixedly securing the magnets 2 and the guard ring 3 to the flywheel 1 in a so-called integrated structure, a hub or boss 5 formed in the flywheel 1 at a center portion of a bottom wall 1a for coupling the flywheel to a rotatable shaft (not shown), and a plurality of fins 4a disposed on the bottom wall 1a of the flywheel 1 with equidistance along the inner circumferential surface of the guard ring 3 for the purpose of generating air currents (also referred to as airflow or currents of gas or the like) for cooling a generator coil (not shown) disposed internally of the flywheel 1.

In the magneto-generator of the structure described above, the flywheel 1 is caused to rotate upon rotation of the rotatable shaft (not shown) coupled to the boss 5, whereby electric energy or electricity is generated under the action of electromagnetic induction taking place between the magnets 2 and the generator coil (not shown) disposed internally of the flywheel 1.

In accompanying to the rotation of the flywheel 1, the fins 4a disposed on the bottom wall 1a of the flywheel 1 rotate for agitating a gas (air) existing within the interior space of the flywheel 1, as a result of which the generator coil (not shown) heated due to the core loss is cooled.

In the conventional magneto-generator of the structure described above, the gas or air existing internally of the flywheel 1 can certainly be agitated. However, no ventilation holes (air holes) are formed in the flywheel 1. Besides, no flow can forcibly be brought about in the gas or air existing externally of the flywheel 1. For these reasons, ventilation internal of the flywheel 1 can not sufficiently be effectuated in the conventional magneto-generator.

On the other hand, the armature winding serving as the generator coil undergoes heating in proportion to the square of the generated current value. Thus, when exchange of the heated gas is not adequately effected due to poor ventilation as mentioned above, then the electrical resistance of the winding increases as the temperature thereof rises, which results in lowering of the efficiency of electricity generation, giving rise to a problem.

SUMMARY OF THE INVENTION

In the light of the state of the art described above, it is an object of the present invention to provide a magneto-generator in which temperature rise of the armature winding serving as the generator coil can positively be suppressed by realizing effective ventilation internally of the flywheel while generating airflows (air currents) externally of the flywheel with high efficiency to thereby effectively prevent the efficiency of electricity generation from being lowered.

In view of the above and other objects which will become apparent as the description proceeds, there is provided according to a general aspect of the present invention a magneto-generator which includes a flywheel implemented substantially in a bowl-like shape, a plurality of magnets disposed on and along an inner peripheral surface of the flywheel, a generator coil disposed internally of the flywheel in opposition to the magnets for generating electricity under the action of electromagnetic induction taking place between the magnets and the generator coil, and a plurality of resin fins disposed along a peripheral edge of the flywheel at an open end thereof for generating forced gas flows in a peripheral region of the flywheel at the open end upon rotation of the flywheel to thereby cool the generator coil.

In a preferred mode for carrying out the invention, the magneto-generator may further include a magnet-fixing resin filled in a peripheral space surrounding the magnets for fixedly positioning the magnets relative to the flywheel. In that case, the fins can concurrently be filled with the magnet-fixing resin.

By virtue of the structure of the magneto-generator described above, temperature rise of the generator coil can positively be suppressed with high efficiency owing to ventilation internally of the flywheel as well as generation of airflows externally of the flywheel, whereby lowing of the electricity generation efficiency can effectively be suppressed.

Further, the fins can be installed inexpensively without need for any additional step of forming the fins in the process for manufacturing the rotor.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. Also in the following description, it is to be understood that such terms as "top", "bottom" and the like are words of convenience and are not to be construed as limiting terms.

Embodiment 1

Figure 1:
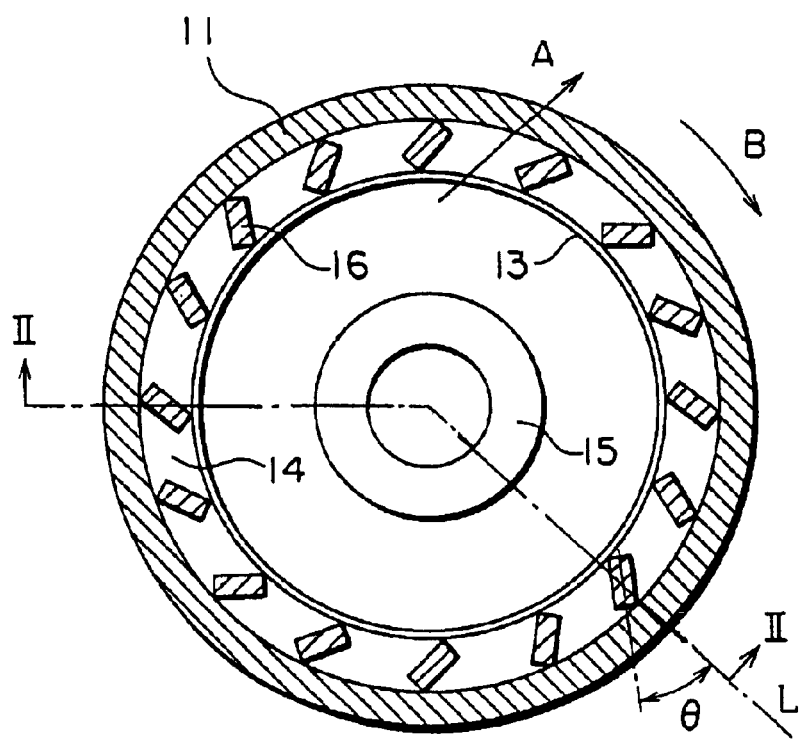
FIG. 1 is a top plan view showing partially in section a structure of a rotor of a magneto-generator according to a first embodiment of the invention.
Figure 2:
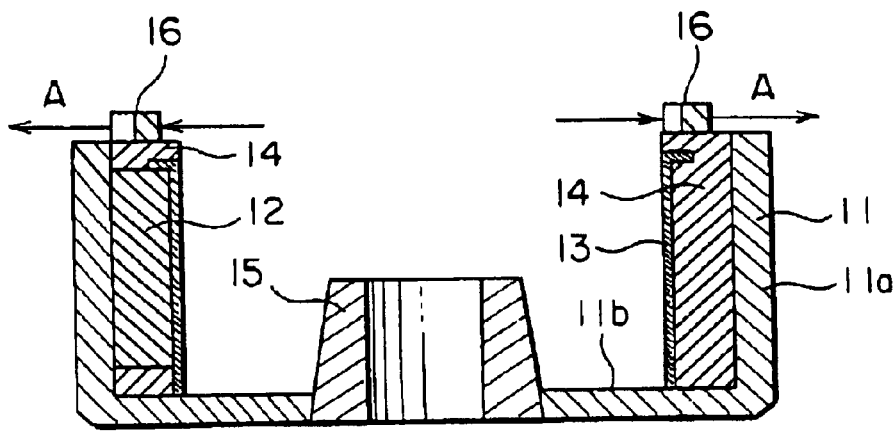
FIG. 2 is a vertical sectional view of the same taken along a line II—II shown in FIG. 1 and viewed in the direction indicated by arrows.
Figure 5:
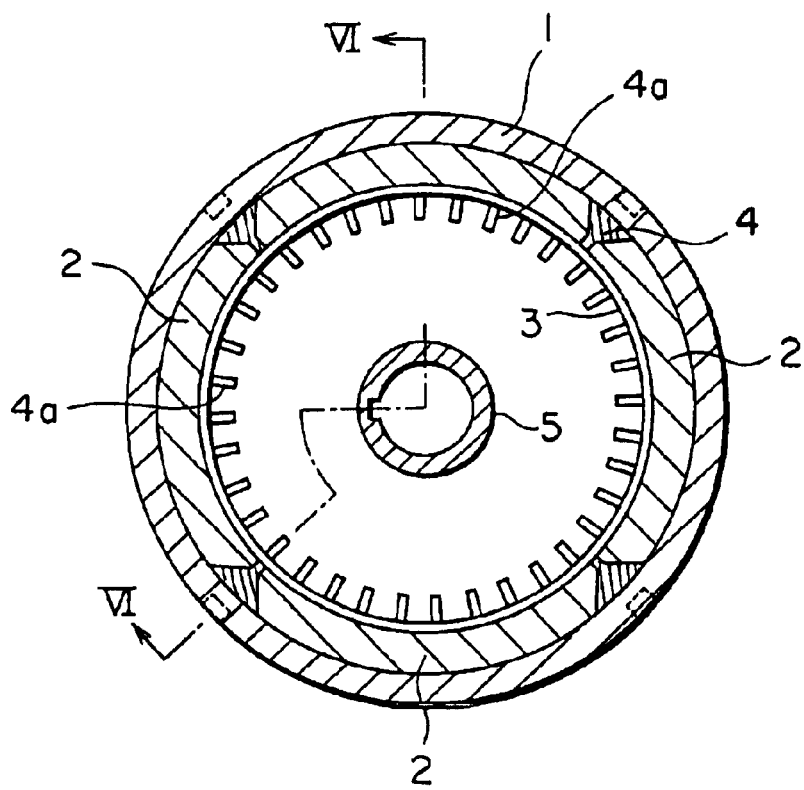
FIG. 5 is a top plan view showing partially in section a rotor of a conventional flywheel type magneto-generator.
Figure 6:
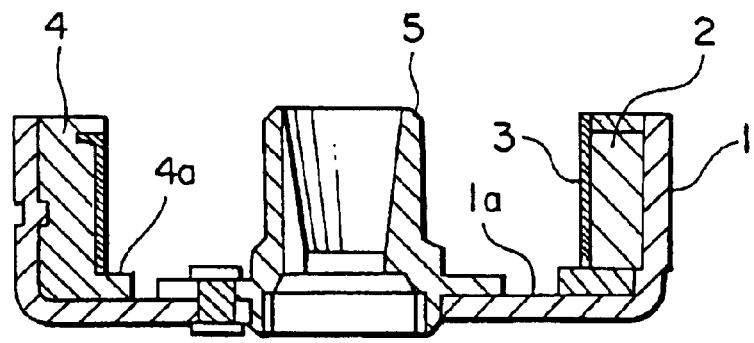
FIG. 6 is a vertical sectional view of the same taken along a line VI—VI shown in FIG. 5 and viewed in the direction indicated by arrows.

FIG. 1 is a top plan view showing partially in section a rotor of a magneto-generator according to a first embodiment of the present invention. FIG. 2 is a vertical sectional view of the same taken along a line II—II shown in FIG. 1 and viewed in the direction indicated by arrows. Referring to FIG. 1, the rotor of the magneto-generator according to the instant embodiment of the invention includes a substantially bowl-shaped flywheel 11 which is composed of a substantially cylindrical peripheral wall 11a and a bottom portion 11b formed integrally with the substantially cylindrical peripheral wall 11a so as to close one end thereof while leaving the other end opened. Formed at a center of the bottom portion 11b of the flywheel 11 is a hub or boss 15 which is used for coupling the rotor to a rotatable shaft, such as a crank shaft (not shown) of an internal combustion engine (not shown either). Further, four magnets 12 each having an arcuate cross-section are disposed in a circular array on the inner peripheral surface of the cylindrical peripheral wall 11a of the flywheel 11, being positioned stationarily by the guard ring 13 at respective predetermined positions in the axial direction, similarly to the rotor of the conventional magneto-generator described hereinbefore by reference to FIGS. 5 and 6.

The guard ring 13 which is designed to hold the individual magnets disposed circumferentially in close contact with the inner peripheral surface of the peripheral wall 11a of the flywheel 11 is implemented in a substantially cylindrical shape and disposed in tight contact with the inner side surfaces of the magnets 12. An annular space defined between the guard ring 13 and the peripheral wall 11a of the flywheel 11 is filled with a resin 14 so that the individual magnets are surrounded with the resin to be fixedly embedded therein. The layer of the magnet fixing resin 14 is provided with a plurality of fins 16 each of which is equally formed of a resin in the form of a flat plate at the open end side of the flywheel 11. More specifically, the fins 16 are provided along the whole circumferential edge of the open end of the flywheel 11 with equidistance therebetween each with inclination of a predetermined angle θ relative to a virtual radial line L extending radially from the center of the flywheel 11, as can clearly be seen in FIG. 1. These fins 16 serve for generating air currents or gas flows in the peripheral region at the side of the open end of the flywheel 11 in the direction indicated by arrows A in FIGS. 1 and 2 upon rotation of the flywheel 11. By adjusting the inclination angle θ, the action of the air currents produced by the fins 16 can be adjusted or regulated.

In fabrication of the fins 16, a mold (not shown) used for filling the magnet-fixing resin 14 may previously be provided with proper internal shape for forming the fins 16 so that the fins 16 can be formed at the open end side of the flywheel 11 concurrently with filling of the resin 14 for fixedly securing the magnets. In this way, the fins 16 can be fabricated inexpensively without need for any additional step of forming the fins in the process for manufacturing the rotor.

Figure 3:
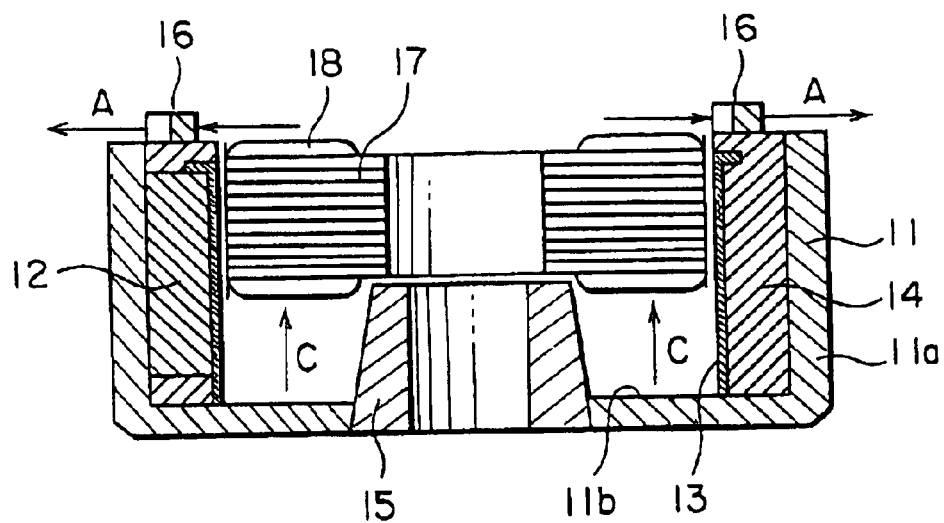
FIG. 3 is a side elevational view showing partially in section a flywheel constituting the rotor together with an armature disposed in opposition to the flywheel.

Referring to FIG. 1, when the flywheel 11 is rotated in the direction indicated by an arrow B, air currents are generated in the direction indicated by the arrow A. In other words, the air currents flow in the direction from the inside of the flywheel 11 toward the outside thereof. FIG. 3 is a side elevational view showing partially in section the flywheel 11 together with an armature 17 disposed in opposition to the flywheel 11. When the air currents are generated in the direction A as mentioned above, there are also generated the air currents which flow in the direction indicated by arrows C to thereby sweep the surface of the armature winding 18 which constitutes the generator coil. Thus, the temperature rise of the armature winding 18 due to heat generation brought about by the armature current can be suppressed, which in turn contribute to preventing the electricity generation efficiency of the magneto-generator from being lowered.

Further, due to change in the pressure brought about by the air currents (gas flows) generated at the open end of the flywheel 11, corresponding change in the pressure of the air is induced internally of the flywheel 11, as a result of which the gas or air housed within the flywheel 11 is discharged while being agitated. In this manner, the temperature rise of the armature winding 18 due to heat generation by the armature current can further be suppressed, which further contributes to protecting effectively the electricity generation efficiency against lowering.

As is apparent from the above, the magneto-generator according to the first embodiment of the present invention includes the flywheel 11 implemented substantially in the bowl-like shape, a plurality of magnets 12 disposed on and along the inner peripheral surface of the flywheel 11, the generator coil (armature winding 18) disposed internally of the flywheel 11 in opposition to the magnets 12 for generating electricity under the action of electromagnetic induction taking place between the magnets 12 and the generator coil, and the fins 16 provided along a peripheral edge of the flywheel 11 at the open end thereof for generating forced air flows in the peripheral region at the open end upon rotation of the flywheel 11 to thereby cool the generator coil (armature winding 18). Thus, upon rotation of the flywheel, the gas or air currents are forcibly generated in the peripheral region at the open end side of the flywheel 11 by the fins provided along the peripheral edge of the flywheel 11 at the open end thereof, whereby the temperature rise of the armature winding 18 serving as the generator coil can effectively be suppressed in the region at the open end of the flywheel, which contributes to protecting the electricity generation efficiency against lowering.

Further, due to the change of pressure brought about by the forced air currents at the open end of the flywheel 11, change of the pressure of the gas or air is also induced internally of the flywheel 11, whereby the gas or air housed within the flywheel 11 is forcibly discharged while being agitated. Thus, the temperature rise of the armature winding 18 serving as the generator coil due to heating by the armature current can effectively be suppressed, which contributes to further preventing the lowering of the electricity generation efficiency of the magneto-generator.

Furthermore, in the magneto-generator according to the first embodiment of the invention, the peripheral space surrounding the magnets 12 is filled with the resin 14 for fixedly positioning the magnets 12 relative to the flywheel 11. In that case, the fins 16 can be formed of the magnet-fixing resin concurrently upon filling thereof. Thus, the fins 16 can be fabricated inexpensively without need for addition of any step of forming the fins in the process for manufacturing the rotor.

Embodiment 2

Figure 4:
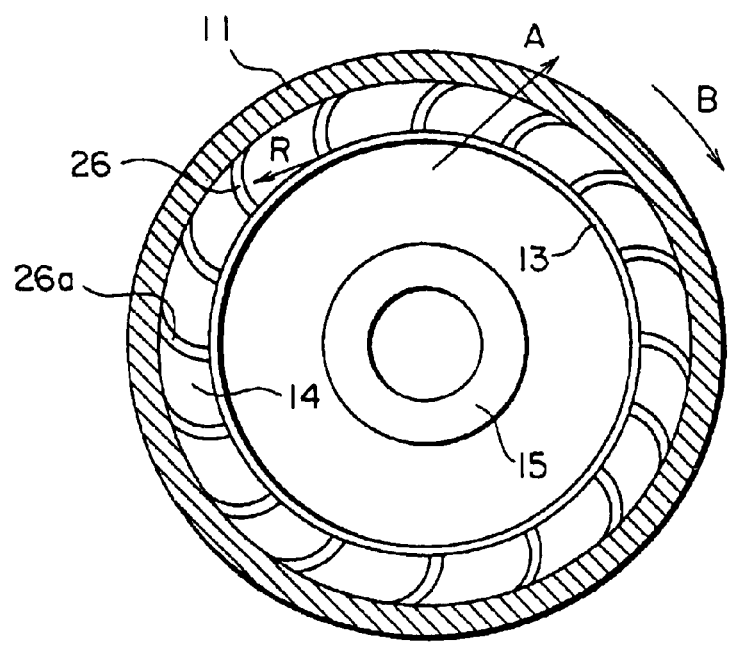
FIG. 4 is a top plan view showing partially in section a structure of a flywheel serving as a rotor of a magneto-generator according to a second embodiment of the invention.

FIG. 4 is a plan view showing partially in section a rotor of the magneto-generator according to a second embodiment of the present invention. In the case of the instant embodiment of the invention, each of the fins 26 is implemented in an arcuate shape in cross-section. More specifically, the side surface of the fin 26 onto which the gas or air impinges when the flywheel 11 rotates in the direction indicated by an arrow B shown in FIG. 4 is formed concavely. In other words, the fin 26 presents a surface 26a curved (rounded) concavely in the rotating direction of the rotor. Thus, the gas or air can be trapped by the fins more positively, whereby the forced gas flows can be generated with enhanced efficiency.

The present invention has provided the magneto-generator which includes the flywheel implemented substantially in the bowl-like shape, a plurality of magnets disposed on and along the inner peripheral surface of the flywheel, the generator coil disposed internally of the flywheel in opposition to the magnets for generating electricity under the action of electromagnetic induction taking place between the magnets and the generator coil, and a plurality of resin fins disposed along the peripheral edge of the flywheel at the open side thereof for generating forced gas flows in the peripheral region at the open end of the flywheel upon rotation of the flywheel to thereby cool the generator coil.

By virtue of the arrangement of the magneto-generator described above, temperature rise of the generator coil can positively be prevented by realizing ventilation within the flywheel as well as generation of external air currents with high efficiency, whereby the electricity generation efficiency of the magneto-generator can be protected against lowering.

In the magneto-generator described above, the magneto-generator can further include the magnet-fixing resin filled in peripheral spaces surrounding the magnets for thereby fixedly positioning the magnets relative to the flywheel. In that case, the fins can concurrently be filled with the magnet-fixing resin.

Owing to the arrangement mentioned above, the fins can be fabricated inexpensively without need for addition of the step of forming the fins in the process for manufacturing the rotor.

Further, in the magneto-generator of the arrangement described just above, forced gas flows (air currents) can be generated upon rotation of the flywheel, whereby the gas (air) is forcibly discharged outwardly from the interior of the flywheel.

In that case, change is brought about in the pressure of gas in the peripheral region of the flywheel at the open end thereof. As a result of this, pressure change is also induced internally of the flywheel, which in turn results in that the gas housed within the flywheel is discharged while being agitated. Thus, the temperature rise of the generator coil due to heating by the armature current can effectively be suppressed, which further contributes to protecting the electricity generation efficiency of the magneto-generator against lowering.

Moreover, in the magneto-generator described above, each of the fins can be so configured as to present the concavely curved side surface in the rotating direction of the flywheel.

With this structure, the gas (air) can be trapped by the fins more positively, whereby the forced gas flows (air currents) can be generated with enhanced efficiency.

Many modifications and variations of the present invention are possible in the light of the above techniques. It is therefore to be understood that within the scope of the appended claims, the invention may be practiced otherwise than as specifically described.

What is claimed is:

1. A magneto-generator, comprising:

a flywheel implemented substantially in a bowl-like shape;

a plurality of magnets disposed on and along an inner peripheral surface of said flywheel;

a generator coil disposed internally of said flywheel in opposition to said magnets for generating electricity under the action of electromagnetic induction taking place between said magnets and said generator coil; and a plurality of resin fins disposed along a peripheral edge of said flywheel at an open end thereof for generating forced gas flows in a peripheral region of said flywheel at the open end thereof upon rotation of said flywheel to thereby cool said generator coil, each of said fins elongated a direction with an inclination of a predetermined angle with respect to a radial line of said flywheel.

2. The magneto-generator according to claim 1, further comprising:

a magnet-fixing resin filled in a peripheral space surrounding said magnets for fixedly positioning said magnets relative to said flywheel, wherein said fins are formed of said magnet-fixing resin concurrently with filling of said magnet-fixing resin.

3. The magneto-generator according to claim 1, wherein said fins are so designed as to generate forced gas flows for forcibly discharging gas outwardly from interior of said flywheel upon rotation of said flywheel.

4. The magneto-generator according to claim 1, wherein each of said fins presents a concavely curved side surface in a direction in which said flywheel rotates.

* * * * *